US011235874B2

(12) United States Patent
Jones et al.

(10) Patent No.: US 11,235,874 B2
(45) Date of Patent: Feb. 1, 2022

(54) AUTOMATED DRONE-BASED SPRAYING SYSTEM

(71) Applicant: Greensight Agronomics, Inc., Boston, MA (US)

(72) Inventors: Robert M. Jones, Boston, MA (US); James R. Peverill, Milpitas, CA (US); Andrew D. Delollis, Boston, MA (US)

(73) Assignee: Greensight Agronomics, Inc., Boston, MA (US)

( * ) Notice: Subject to any disclaimer, the term of this patent is extended or adjusted under 35 U.S.C. 154(b) by 142 days.

(21) Appl. No.: 16/367,783

(22) Filed: Mar. 28, 2019

(65) Prior Publication Data

US 2019/0389577 A1 Dec. 26, 2019

Related U.S. Application Data

(60) Provisional application No. 62/650,759, filed on Mar. 30, 2018.

(51) Int. Cl.
*B64C 39/02* (2006.01)
*B64D 1/18* (2006.01)
(Continued)

(52) U.S. Cl.
CPC .............. *B64C 39/024* (2013.01); *B64D 1/18* (2013.01); *G05D 1/0088* (2013.01);
(Continued)

(58) Field of Classification Search
CPC ............ B64C 39/024; B64C 2201/128; B64C 2201/145; B64D 1/18; G05D 1/0088; G05D 1/0094; G05D 1/104
See application file for complete search history.

(56) References Cited

U.S. PATENT DOCUMENTS 7,184,859 B2  2/2007  Hood et al.
7,610,122 B2  10/2009  Anderson
(Continued)

FOREIGN PATENT DOCUMENTS

DE   202015102833 U1   10/2015
WO   WO 2017/077543 A1   5/2017

OTHER PUBLICATIONS

Bagheri et al., "Multispectral Remote Sensing for Site-Specific Nitrogen Fertilizer Management," Pesquisa Agropecuaria Brasileira, vol. 48, No. 10, pp. 1394-1401, 2013.
(Continued)

*Primary Examiner* — Tyler J Lee
*Assistant Examiner* — Yufeng Zhang
(74) *Attorney, Agent, or Firm* — Patterson Thuente Pedersen, P.A.

(57) ABSTRACT

Systems and methods for the automated aerial application of chemicals onto agricultural areas. Unmanned aerial vehicles (UAVs) are configured to selectively attach to modular sprayer payloads, each payload having a payload reservoir, a spray nozzle, a pump, and a battery. A ground station having landing pads for the UAVs is configured to coordinate and automatically fill at least one payload reservoir from a material tank and provide the payload to a given UAV. A control subsystem can determine a mission plan and command the UAV to selectively deliver the contents of the payload reservoir to at least a portion of one or more agricultural areas.

18 Claims, 11 Drawing Sheets

(51) Int. Cl.
*G05D 1/10* (2006.01)
*G05D 1/00* (2006.01)
(52) U.S. Cl.
CPC ........... *G05D 1/0094* (2013.01); *G05D 1/104* (2013.01); *B64C 2201/128* (2013.01); *B64C 2201/145* (2013.01)

(56) References Cited

U.S. PATENT DOCUMENTS

| | | | |
|---|---|---|---|
| 8,712,148 B2* | 4/2014 | Paris | G06T 11/00 382/165 |
| 9,302,770 B2 | 4/2016 | Burgess et al. | |
| 9,382,003 B2 | 7/2016 | Burema et al. | |
| 9,387,928 B1 | 7/2016 | Gentry et al. | |
| 9,389,298 B2 | 7/2016 | Smitherman | |
| 9,505,494 B1* | 11/2016 | Marlow | B64C 39/024 |
| 9,519,861 B1 | 12/2016 | Gates et al. | |
| 9,619,776 B1* | 4/2017 | Ford | B64C 39/024 |
| 9,638,678 B2 | 5/2017 | Shriver et al. | |
| 9,734,400 B2 | 8/2017 | Shriver | |
| 9,756,844 B2 | 9/2017 | Groeneveld | |
| 9,791,316 B2 | 10/2017 | Ritter et al. | |
| 9,792,557 B2 | 10/2017 | Mathur et al. | |
| 9,922,405 B2 | 3/2018 | Sauder et al. | |
| 2009/0271719 A1 | 10/2009 | Clare et al. | |
| 2011/0061764 A1 | 3/2011 | Springer | |
| 2011/0121020 A1 | 5/2011 | Springer | |
| 2012/0101634 A1 | 4/2012 | Lindores | |
| 2013/0118639 A1 | 5/2013 | Springer | |
| 2014/0032034 A1* | 1/2014 | Raptopoulos | G05D 1/0088 701/25 |
| 2014/0303814 A1 | 10/2014 | Burema et al. | |
| 2016/0039300 A1* | 2/2016 | Wang | B60L 53/80 244/39 |
| 2016/0048137 A1* | 2/2016 | Phillips | G05D 9/12 137/2 |
| 2016/0050840 A1 | 2/2016 | Sauder et al. | |
| 2016/0086032 A1 | 3/2016 | Pickett | |
| 2016/0133039 A1 | 5/2016 | Ritter et al. | |
| 2016/0144734 A1 | 5/2016 | Wang et al. | |
| 2016/0239709 A1 | 8/2016 | Shriver | |
| 2016/0307448 A1* | 10/2016 | Salnikov | A01B 79/005 |
| 2016/0328827 A1 | 11/2016 | Ilic et al. | |
| 2016/0334276 A1 | 11/2016 | Pluvinage | |
| 2017/0129605 A1 | 5/2017 | Wu et al. | |
| 2017/0131254 A1 | 5/2017 | Shriver et al. | |
| 2017/0190260 A1* | 7/2017 | Wang | B64D 45/04 |
| 2017/0223889 A1 | 8/2017 | Cavender-Bares | |
| 2017/0253349 A1 | 9/2017 | Wang et al. | |
| 2017/0336203 A1 | 11/2017 | Barnes et al. | |
| 2018/0099747 A1* | 4/2018 | Peng | B64D 1/18 |
| 2018/0118340 A1* | 5/2018 | Russo | A01K 59/00 |
| 2018/0293444 A1 | 10/2018 | Buoro et al. | |
| 2019/0026896 A1 | 1/2019 | Kluckner et al. | |
| 2019/0031346 A1* | 1/2019 | Yong | A01G 25/09 |
| 2019/0066234 A1 | 2/2019 | Bedoya et al. | |
| 2019/0073534 A1 | 3/2019 | Dvir et al. | |
| 2019/0082650 A1* | 3/2019 | Lepek | G01C 21/3453 |
| 2019/0114481 A1 | 4/2019 | DeChant et al. | |
| 2019/0144097 A1* | 5/2019 | Benson | B64C 39/024 244/131 |
| 2019/0265735 A1* | 8/2019 | Ishikawa | B64C 13/18 |
| 2019/0387687 A1 | 12/2019 | Nitsch et al. | |
| 2019/0392211 A1 | 12/2019 | Hartman et al. | |

OTHER PUBLICATIONS

Ball et al., "A Comprehensive Survey of Deep Learning in Remote Sensing: Theories, Tools and Challenges for the Community," Mississippi State University & University of Malaysia, Sep. 2017, 64 pages.
Bedord, "Sentera NDVI Crop Health Maps Show Field Contrast and Progression," Successful Farming, Jan. 2017, 7 pages.
Budde et al., "Agriculture and Food Availability—Remote Sensing of Agriculture for Food Security Monitoring in the Developing World," IEEE Oceanic Engineering Society, Feb. 2010, 10 pages.
Burwood-Taylor, "The Growing Ecosystem of Satellite Imagery for Ag," AFN, Mar. 2016, 10 pages.
Chao et al., "AggieAir: Towards Low-Cost Cooperative Multispectral Remote Sensing Using Small Unmanned Aircraft Systems," Advances in Geoscience and Remote Sensing, www.itechopen.com, Oct. 2009, 29 pages.
Chew, "Early Detection of Plant Disease Using Close Range Sensing System for Input into Digital Earth Environment," 8th International Symposium of the Digital Earth (ISDE8), 2014, 6 pages.
De Castro Victoria, "Cropland Area Estimates Using Modis NDVI Time Series in the State of Mato Grosso, Brazil," Pesq. Agropec. Bras., Brasilia, v47, n9, 2012, p. 1270-1278.
De Filippis et al., "A WebGIS Application for Precision Viticulture: From Research to Operative Practices," WebMGS 2010, ISPRS Conference, XXXVIII/4-W13, Jan. 2010, 7 pages.
Earth Observatory, "Measuring Vegetation (NDVI & EVI), NDVI as an Indicator of Drought," NASA, Aug. 2000, 3 pages.
Getahun Tadesse Kabthimer, "Assessment of Spatio-Temporal Patterns of NDVI in Response to Precipitation Using NOAA-AVHRR Rainfall Estimate and NDVI Data From 1996-2008, Ethiopia," 2012, 41 pages.
Hatfield et al., "Application of Spectral Remote Sensor for Agronomic Decisions," Agron J., vol. 100, No. Supplement 3, p. S-117, 2008, 16 pages.
Kassa, "Drought Risk Monitoring for the Sudan Using NDVI," University College London, Aug. 1999, 47 pages.
Khan et al., "Forest Change Detection in Incomplete Satellite Images with Deep Neural Networks," IEEE Transactions on Geoscience and Remote Sensing, vol. X, No. X, Aug. 2016, 17 pages.
Leilei et al., "The Relationship Analysis of Vegitation Cover, Rainfall and Land Surface Temperature Based on Remote Sensing in Tibet, China," IOP Conf. Series: Earth and Environmental Science 17, 2014, 7 pages.
McKellip et al., "Crop Surveillance Demonstration Using a Near-Daily MODIS Derived Vegetation Index Time Series," Computer Sciences Corporation, Mar. 2005, 5 pages.
Sun et al., "Daily Mapping 0f 30 m LAI and NDVI for Grape Yield Prediction in California Vineyards," Remote Sens., 2017, 18 pages.
Tiedje, Daily Satellite Imagery Creates Crop Monitoring Tool, Illinois Farmer Today, Oct. 2017, 5 pages.
Toksoz et al., "Automated Battery Swap and Recharge to Enable Persistent UAV Missions," American Institute of Aeronautics and Astronautics, 2011, 10 pages.
Wu et al., "Monitoring Cotton Root Rot by Synthetic Sentinel-2 NDVI Time Series Using Improved Spatial and Temporal Data Fusion," Scientific Reports, Jan. 2018, 12 pages.
Xiang et al., "Deep Learning in Remote Sensing: A Review," IEEE Geoscience and Remote Sensing Magazine, Oct. 2016, 60 pages.
Yamaha Motor Co., Ltd., "Yamaha Motor to Exhibit the NEW YMR-01 Industrial Drone at Next Generation Agriculture Expo Tokyo, New Coaxial Rotos Provide Excellent Agrochemicals Spraying Performance," Oct. 10, 2017, 2 pages.
Zhu et al., "Deep Learning in Remote Sensing: A Review," IEEE Geoscience and Remote Sensing Magazine, Oct. 2017, 60 pages.
Application and File history for U.S. Appl. No. 16/367,835, filed Mar. 28, 2019. Inventors: Nitsch et al.
Application and File history for U.S. Appl. No. 16/367,871, filed Mar. 28, 2019. Inventors: Hartman et al.

* cited by examiner

AUTOMATED DRONE-BASED SPRAYING SYSTEM

CROSS-REFERENCE TO RELATED APPLICATIONS

This application claims the benefit of U.S. Provisional Application No. 62/650,759 filed Mar. 30, 2018, and is related to U.S. Patent Application No. 62/650,796 filed on Mar. 30, 2018, each of which are hereby fully incorporated herein by reference.

TECHNICAL FIELD

Embodiments relate generally to agricultural treatments using aerial vehicles. More particularly, embodiments relate to systems and methods for the automated and continuous aerial application of agricultural treatments to agricultural areas.

BACKGROUND

The treatment of agricultural areas using sprayed liquids, such as pesticides, herbicides, fungicides, and fertilizers, was undertaken on a large scale beginning in the early 20th century. Individual plants and small areas could be given precisely targeted treatments by a person using a handheld sprayer, but this was extremely time-consuming and labor intensive. Larger sprayer apparatuses mounted on ground vehicles or airplanes or helicopters were more efficient at applying treatments to large areas of land, but without the ability to precisely target how much chemical could be applied to small areas.

The recent proliferation of low-cost unmanned aerial vehicles (UAVs) has opened up an opportunity for a spraying solution that is as precise and economical with chemicals as a person with a handheld sprayer, but far less costly. Indeed, there are a number of drones available that are equipped with tanks, pumps, and dispersal nozzles. These UAVs are capable of spraying along programmed paths or specific locations, and some even keep a constant altitude above ground automatically. A drone-based aerial sprayer can reach locations that are inconvenient or inaccessible to humans or ground vehicles. Current drone-based aerial sprayers, however, are not truly "unmanned" systems as they require considerable human labor to configure, maintain, fill, and clean before and after each flight. Further, problems remain in how to manage the security of the ground station, accuracy of aerial vehicle-ground station interaction, as well as battery-payload integration.

In one example, U.S. Patent Application Pub. No. 2014/0303814, entitled, "Aerial farm robot system for crop dusting, planting, fertilizing and other field jobs," describes a drone-based system in which multiple aerial farm robots, each having a payload reservoir, are configured to interface with a landing station for refilling and recharging.

In another example, U.S. Pat. No. 7,610,122, entitled, "Mobile station for an unmanned vehicle," describes a mobile station for an unmanned vehicle including a storage area for storing a vehicle with a revolving storage device that stores transportable payload modules.

In another example, U.S. Patent Application Pub. No. 2017/0129605, entitled "Spraying system having a liquid flow and rotating speed feedback," describes systems and methods for determining a liquid flow in a spraying system mounted on UAVs.

In another example, U.S. Patent Application Pub. Nos. 2017/0190260, and 2016/0144734 both entitled, "System and method for managing unmanned aerial vehicles," and assigned to assignee SZ DJI Technology Co. Ltd., describe a base station for automated battery pack or payload exchange using a mechanical arm. Drones of the kind described in these applications, such as the AGRAS MG-1 are available from DJI, but do not offer automated filling of tanks or payloads. (https://www.dji.com/mg-1.)

In another example, U.S. Patent Application Pub. 2017/0253349, entitled, "Positioning mechanism, UAV dock using same, and UAV replenishment method," describes a positioning mechanism for a UAV on a base comprising a landing area and a guide member.

While these disclosures address some of the issues and challenges associated with providing more efficient and automatic drone-based aerial spraying systems, the above disclosures are silent as to any security of the ground station, accuracy of aerial vehicle-ground station interaction, or battery-payload integration. Further, many of the systems require considerable human interaction during operation.

There is a continuing need for systems and methods that can allow UAVs used for drone-based aerial spraying systems to efficiently and automatically attach and carry various payloads containing different types of chemicals and equipment configurations. Further, there is a need for increased security of the ground station, increased accuracy of aerial vehicle-ground station interaction, as well as modular battery-payload integration.

SUMMARY

Embodiments of systems and methods provide one or more unmanned aerial vehicles configured to automatically attach and carry various payloads containing different types of chemicals and equipment configurations. Moreover, embodiments provide increased security of the ground station, increased accuracy of aerial vehicle-ground station interaction, as well as novel battery-payload integration.

In an embodiment, a system for automated aerial application of agricultural treatments to an agricultural area comprises a plurality of unmanned aerial vehicles (UAVs), each UAV configured to operably couple to at least one sprayer payload and aerially distribute sprayer payload chemicals over the agricultural area, wherein each sprayer payload includes a payload reservoir configured to hold the payload chemical, a spray nozzle configured to selectively apply the payload chemical to at least a portion of the agricultural area, a pump configured to pump the payload chemical from the payload reservoir to the spray nozzle, and a battery configured to power the pump; and a ground station including: a plurality of landing pads, each landing pad configured to receive a UAV, wherein at least one sprayer payload is coupled to the UAV at the landing pad, a plurality of material tanks, each material tank configured to hold a single sprayer payload chemical, a fill subsystem operably coupled to the plurality of material tanks and configured to automatically fill at least one payload reservoir, and a control subsystem comprising instructions that, when implemented by a processor operably coupled to memory, cause the processor to: receive a chemical application map, determine a mission plan for the plurality of UAVs based on the chemical application map, and command one or more of the plurality of UAVs to selectively deliver sprayer payload chemicals to at least a portion of the agricultural area according to the mission plan, wherein the fill subsystem is configured to automatically fill the at least one payload reservoir based on the chemical application map prior to commanding the one or more of the plurality of UAVs to selectively deliver sprayer payload chemicals.

In an embodiment, a method of automated aerial application of agricultural treatments comprises providing a plurality of unmanned aerial vehicles (UAVs), each UAV configured to operably couple to at least one sprayer payload and aerially distribute sprayer payload chemicals over the agricultural area, wherein each sprayer payload includes a payload reservoir configured to hold the payload chemical, a spray nozzle configured to selectively apply the payload chemical to at least a portion of the agricultural area, a pump configured to pump the payload chemical from the payload reservoir to the spray nozzle, and a battery configured to power the pump; providing a ground station including a plurality of landing pads, each landing pad configured to receive a UAV, wherein at least one sprayer payload is coupled to the UAV at the landing pad, a plurality of material tanks, each material tank configured to hold a single sprayer payload chemical, and a fill subsystem operably coupled to the plurality of material tanks and configured to automatically fill at least one payload reservoir and a control subsystem comprising instructions that, when implemented by a processor operably coupled to memory, cause the processor to: receive a chemical application map; determine a mission plan for the plurality of UAVs based on the chemical application map; automatically fill at least one payload reservoir based on the chemical application map; and command one or more of the plurality of UAVs to selectively deliver sprayer payload chemicals to at least a portion of the agricultural area according to the mission plan.

In a feature and advantage of embodiments, systems and methods described herein reduce human input by integrating multispectral imaging with the treatment vehicle payload. For example, a drone that picks up the sprayer payload is also equipped with a set of thermal, visible, infrared, or other cameras such that the payload does not obscure the view or imaging capability of its cameras. In another embodiment, the same drone is configured for long-duration imaging-only missions and carries only its cameras instead of the sprayer payload. The data from imaging flights can be analyzed to produce precise prescriptions for chemical application.

In another feature and advantage of embodiments, sprayer payloads can also contain operably coupled batteries, thereby allowing the vehicle to fly continuously. In an embodiment, when sprayer payloads are not actively operating on a spraying flight, the payloads reside in receptacles on the ground station. In embodiments, battery recharging and payload refilling can then be done simultaneously or serially by the ground station. In certain embodiments, batteries can be interfaced with the ground station by Pogo pins or other wired or wireless charging mechanisms.

In another feature and advantage of embodiments, the ground station provides automatic tank filling. Aerial vehicles can only carry a certain volume of liquid. In existing solutions, in order to prepare a conventional sprayer drone to continue spraying after the tank is emptied, a human must refill the tank. In contrast, embodiments described herein provide a ground station including large holding tanks of chemicals. When the drone lands on the ground station, the sprayer tank is automatically refilled from one of the large holding tanks.

In another feature and advantage of embodiments, modular and detachable payloads eliminate the need to clean payload storages between flights. Most agricultural operations need to spray multiple different chemicals that typically cannot be mixed. For example, an herbicide might be used to kill weeds in one area, and a liquid fertilizer might be used to promote plant growth in a different area. To switch from spraying one chemical to another, either the sprayer equipment must be painstakingly cleaned to avoid cross-contamination, or a completely separate tank and sprayer apparatuses must be kept for each chemical in use. This is particularly expensive and difficult when the sprayer is mounted on a flying vehicle. Thus, in contrast to these traditional solutions, a single drone with multiple, modular, and automatically detachable sprayer payloads is presented.

In embodiments, each sprayer payload has a tank, pump, nozzles, and valves, and the drone is equipped with an automatically-actuated attachment/detachment interface. To spray a different chemical, or to quickly pick up another tank of the same chemical, the drone can land the empty sprayer payload into one of the receptacles on the ground station. The drone then detaches the sprayer payload, leaving it in the receptacle to be refilled, and ascends again without the payload. The drone then lands on a second sprayer payload, attaches to the second sprayer payload, takes off, and continues spraying. The modular, detachable sprayer payloads therefore enable the same drone to spray continuously, and to switch quickly and effortlessly between chemicals.

Similarly, modular sprayer types can likewise be switched in and out depending on the chemical and application type. Just as in switching to a different chemical described above, different module types of sprayers can be implemented. One area might need a blanket treatment, and another area might need a pinpoint treatment. With modular sprayer payloads, different types of spray apparatus can be kept ready to use, and quickly interchanged.

In another feature and advantage of embodiments, security is increased over existing solutions. For example, unauthorized drones or humans are not able to pick up the sprayer payloads from the payload receptacles. To prevent unauthorized retrieval, the payload is configured latch onto the landing receptacle until a vehicle authentication process is complete. Thus, an unknown or malicious drone is prevented from accidentally or purposefully removing the sprayer payload.

In one embodiment, an authentication process can be implemented for a wired or wireless communication scheme. For example, the payload mating process using a wireless communication network can be implemented as follows: A sprayer vehicle approaching the landing zone establishes a connection to the wireless network. The vehicle lands on the desired sprayer payload, which is locked to its receptacle. The individual payload, or central computer system, verifies the vehicle using an identifier code unique to each aircraft. If the aircraft identifier matches the expected code, the payload is unlocked from its receptacle. The vehicle then departs the landing zone with the sprayer payload to carry out its mission.

In another feature and advantage of embodiments, the specialized drone and ground system is different from crop spraying solutions due to its automated and unmanned application. Further, the spraying application is ideal for non-row agricultural applications in which varied precision application is required.

In another feature and advantage of embodiments, and in contrast to the heavy equipment incorporated in existing UAV systems which shorten the amount of time the UAV can be the air, embodiments described herein provide lightweight and modular payload, battery, and, where appropriate, imaging attachments, to allow the UAV to fly increased distances and with longer flight times. Thus, embodiments accommodate larger sprayer drones as well as adapting smaller, lighter drones for both spraying and imaging.

In another feature and advantage of embodiments, battery replenishment is more efficient compared to existing systems. Conventional sprayer drones typically batteries that must be removed and replaced, or removed and charged by a human. The modular sprayer payloads described herein can be equipped with a battery that charges as the payload sits in its ground station receptacle. Further, when the drone attaches to a full sprayer payload, the drone can draw electrical power from the battery-equipped payload. Thus, in addition to receiving a fresh fill of liquid, the drone can also receive a freshly charged battery. This capability allows for continuous flight operations without human intervention.

The terms "UAV," "unmanned aerial vehicle," "aerial vehicle," "drone," "treatment vehicle," "flight vehicle," "flying vehicle," "aircraft," and similar terminology are used interchangeably throughout this document and refer to the unmanned aerial vehicle illustrated and described herein.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
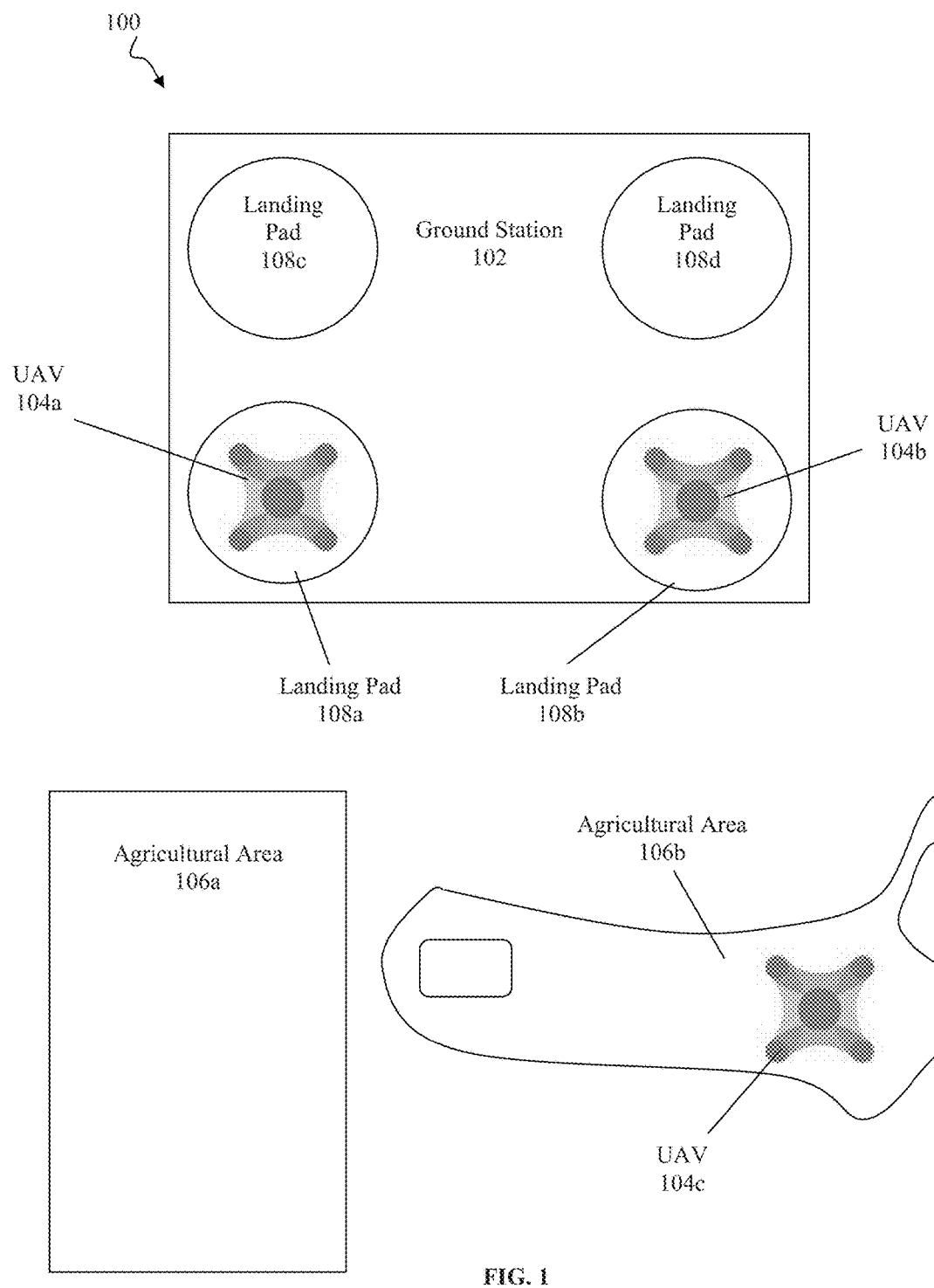
FIG. 1 is a block diagram of a system for automated aerial application of agricultural treatments, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of a system 100 for automated aerial application of agricultural treatments is depicted, according to an embodiment. System 100 generally comprises a ground station 102 and a plurality of UAVs 104 for interfacing with a plurality of agricultural areas 106.

Ground station 102 generally comprises a plurality of physical receptacles for UAVs 104 to land. For example, as depicted in FIG. 1, ground station 102 comprises a plurality of landing pads 108. Landing pads 108 can be configured to receive one or more UAVs 104. In other words, UAVs can land in or on landing pads 108.

In an embodiment, as will be described with respect to FIGS. 3-4, ground station 102 can further comprise a number of components interfacing with the UAVs 104 landing on various landing pads 108. For example, landing pads 108 can be further configured for payload refilling, battery recharging, and storing sprayer payloads.

Ground station 102 can further comprise liquid filling subsystem including a plurality of pumps, valves, and fluid connectors. Ground station 102 can further comprise holding tanks for chemicals for the various payloads. In an embodiment, each tank can correspond to one of the sprayer payloads. In another embodiment, each tank can provide chemicals that, when mixed with other tank chemicals, correspond to one of the sprayer payloads. Ground station 102 can further comprise battery charging assemblies and connectors. Ground station 102 can further comprise a computing device for ground station 102 control, such as handing off of UAVs, fill control, and battery control. In an embodiment, ground station 102 can further comprise one or more sensors to aid in UAV—ground station interaction, such as takeoff and landing.

Each UAV 104 is a flight vehicle capable of vertical takeoff and landing. UAVs 104 are configured to carry sprayer payloads to and from ground station 102. More particularly, UAVs 104 are configured to carry sprayer payloads to various agricultural areas, such as agricultural areas 106a and 106b and precisely spray the agricultural area over which the UAV 104 is flying. In an embodiment, UAVs 104 are further configured to can carry multispectral imaging payload for survey flights in addition to the sprayer payload(s).

A sprayer payload can comprise a reservoir for holding at least one chemical, one or more electric pumps for pumping the chemical, one or more electrically controllable valves for regulating, directing, or controlling the flow of the chemical, one or more spray nozzles for applying the chemical, and a battery configured to power the sprayer pump. In another embodiment, the payload battery powers the sprayer pump and also provides power or supplemental power to the UAV.

Figure 2A:
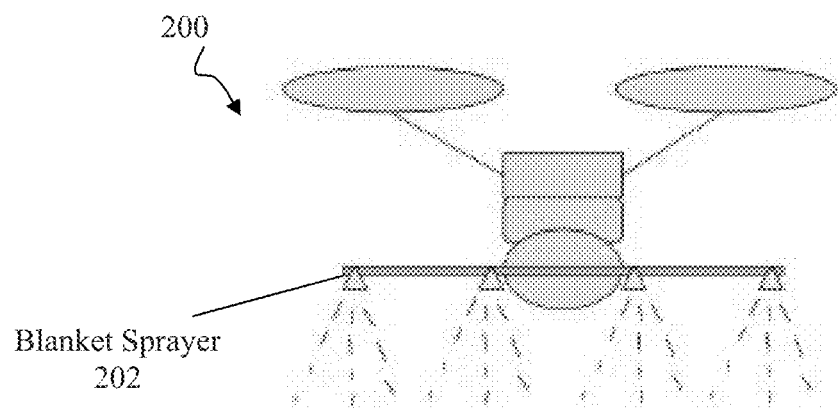
FIG. 2A is an illustration of an unmanned aerial vehicle with a blanket sprayer attachment, according to an embodiment.
Figure 2B:
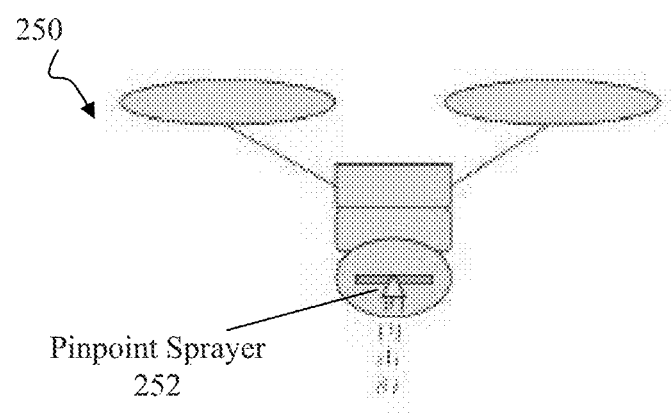
FIG. 2B is an illustration of an unmanned aerial vehicle with a pinpoint sprayer attachment, according to an embodiment.

Sprayer payloads can comprise nozzles for various spraying precisions. For example, referring to FIG. 2A, an illustration of an unmanned aerial vehicle 200 with a blanket sprayer attachment 202 is depicted, according to an embodiment. Blanket sprayer attachment 202 can comprise a plurality of nozzles for blanket application. In another example, referring to FIG. 2B, an illustration of an unmanned aerial vehicle 250 with a pinpoint sprayer attachment 252 is depicted, according to an embodiment. Pinpoint sprayer attachment 252 can comprise a single nozzle or plurality of integrated nozzles for concentrated stream application. In embodiments, both types of sprayers are positioned on the UAV below the height of the drone such that the drone blades are higher than 7'-8' from the ground, for human safety reasons. In certain embodiments, as will be described, a sprayer payload can further comprise supplementary thrusters to help propel the UAV and thus allow a smaller UAV to be used as a primary flight vehicle.

Agricultural areas 106 can comprise for example, the generally open and expansive agricultural area 106a, or more narrow and partitioned agricultural area 106b, or any area in size and scope in between. In embodiments, agricultural areas 106 can comprise vineyards, golf courses, solar panel farms, and so on.

Referring again to FIG. 1, a first UAV 104a is positioned on a first landing pad 108a. First UAV 104a can be secured to first landing pad 108a with any number of attachment/detachment hardware mechanisms, such as mechanical mating interfaces on the flight vehicle and the sprayer payload. In embodiments, geometric features can help align the mating components. In an embodiment, additional connections such as an electrical connection for carrying battery voltage from the sprayer payload to the flight vehicle, or vice versa, and a communication link between the flight vehicle and the sprayer payload can accompany the mechanical mating. In embodiments, the electrical connection can be wired or wireless, such as by a radio device.

Similarly, a second UAV 104b is positioned on a second landing pad 108b. Landing pads 108c and 108d are illustrated as open to receive other UAVs, such as UAV 104c.

The process flow of system 100 will be described in greater detail later, but in general, UAVs 104 are coupled with payloads (or the payloads are filled) at ground station 102, then leave to fly over agricultural areas 106. As shown in FIG. 1, UAV 104c is depicted flying proximate agricultural area 106b. In an embodiment, UAV 104c can deliver one or more chemicals to one or more regions of agricultural area 106b. After delivering one or more chemicals, UAV 104c can return to ground station 102 to recharge, be refilled, or pick up a different payload for subsequent application to agricultural areas 106. Similarly, UAV 104a and/or UAV 104b can deliver one or more chemicals to one or more regions of agricultural area 106b after launching from ground station 102.

Figure 3:
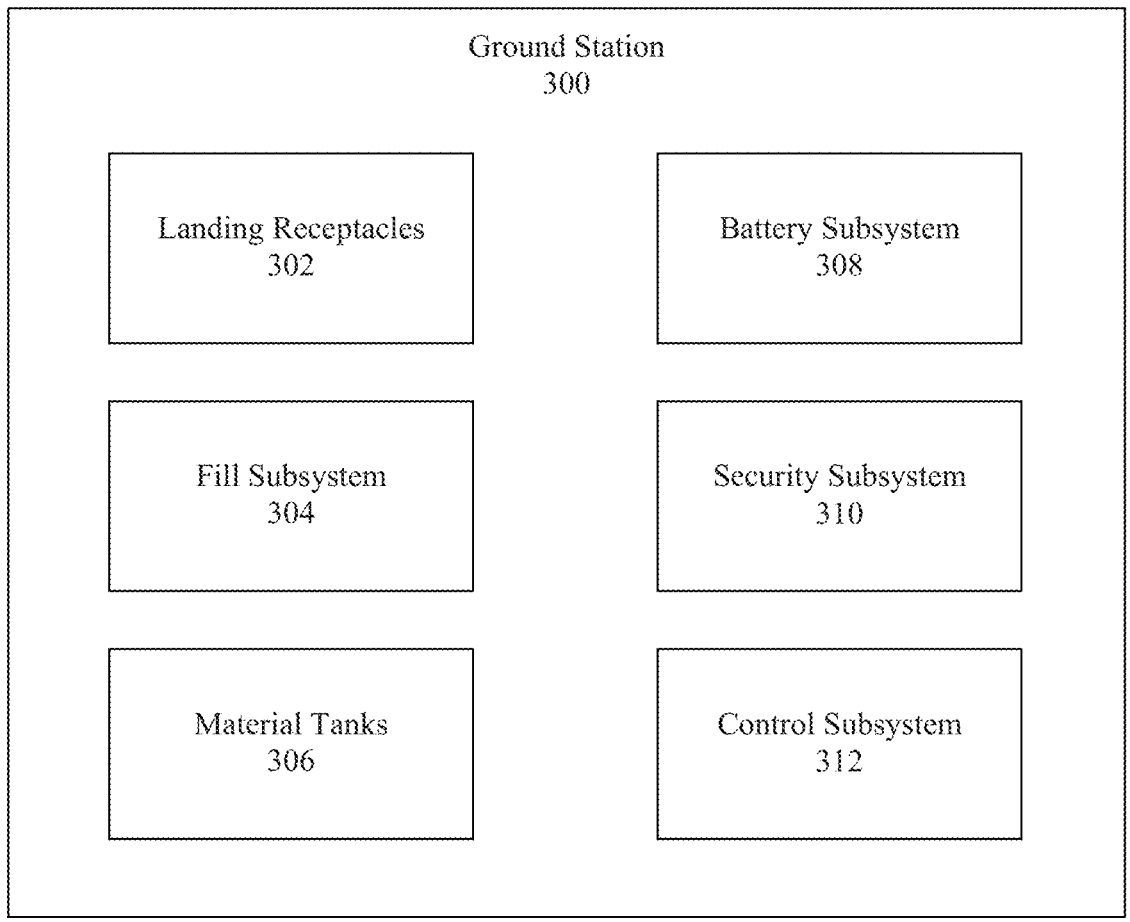
FIG. 3 is a block diagram of a ground station for a system for automated aerial application of agricultural treatments, according to an embodiment.

Referring to FIG. 3, a block diagram of ground station 300 for a system for automated aerial application of agricultural treatments is depicted, according to an embodiment. Ground station 300 can be substantially similar to ground station 102 as depicted in FIG. 1.

In an embodiment, ground station 300 generally comprises landing receptacles 302, fill subsystem 304, material tanks 306, battery subsystem 308, security subsystem 310, and control sub system 312.

Some of the subsystems of ground station 300 include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, and the corresponding methods of configuring and operating the system, can be performed in cloud computing, client-server, or other networked environments, or any combination thereof. The components of the system can be located in a singular "cloud" or network, or spread among many clouds or networks. End-user knowledge of the physical location and configuration of components of the system is not required.

As will be readily understood by one of skill in the art, the subsystems of ground station 300 can be implemented by at least one processor and operably coupled memory. The processor can be any programmable device that accepts digital data as input, is configured to process the input according to instructions or algorithms, and provides results as outputs. In an embodiment, a processor can be a central processing unit (CPU) configured to carry out the instructions of a computer program. A processor is therefore configured to perform at least basic arithmetical, logical, and input/output operations.

Memory operably coupled to the processor can comprise volatile or non-volatile memory as required by the coupled processor to not only provide space to execute the instructions or algorithms, but to provide the space to store the instructions themselves. In embodiments, volatile memory can include random access memory (RAM), dynamic random-access memory (DRAM), or static random-access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Landing receptacles 302 are configured to receive one or more UAVs. In an embodiment, landing receptacles 302 can be substantially similar to landing pads 108 illustrated in FIG. 1 for refilling, recharging, and storing sprayer payloads. Landing receptacles 302 are integrated with fill subsystem 304, battery subsystem 308, and security subsystem 310, as controlled by controlled subsystem 312.

In an embodiment, sprayer payloads can be identified within ground station 300 by a UAV. For example, a wired or wireless communication connection between the UAV and payload can identify a particular payload, as well as particular spray and actuation functions provided by the particular sprayer. In an example, consider a ground station with four landing areas, such as those depicted in FIG. 1, where each landing receptacle 302 has a different payload chemical. Upon landing approach, a UAV can communicate with ground station 300 to identify the particular receptacle 302 with a desired chemical and land on that receptacle 302. Landing receptacles 302, payloads, and/or UAVs can each be fitted with a radio-frequency identification (RFID) tag, near-field communication (NFC) device, infrared (IR) or other localized communication hardware.

In embodiments, ground station 300 can further comprise a processor operably coupled to memory with instructions for coordination of the payloads relative to particular landing receptacles 302. In other embodiments, sprayer payload identification can be coordinated with control subsystem 312 (and/or security subsystem 310).

In an embodiment, landing receptacles 302 and, in some embodiments, the processor of ground station 300 can aid in positioning and managing payload tanks on a receiving vehicle so that the vehicle flies most efficiently. For example, one concern with transporting liquid on an aerial vehicle is a shifting center of gravity, caused either by sloshing or by asymmetrical discharge from multiple tanks. The aircraft can typically compensate for such changes, but at the expense of efficiency.

In an embodiment, liquid sloshing is managed with internal tank baffles or open-cell foam that prevent sudden shifts in the liquid. In versions of sprayer payloads having multiple tanks, asymmetrical draining can be prevented by using electronically controlled valves that allow coordinated discharge from both tanks simultaneously.

In an embodiment, all sprayer payloads are preconfigured for a certain position on the vehicle in a known configuration. In embodiments, one tank per payload further reduces any issues related to variable center of gravity.

Moreover, in embodiments, a common coupling mechanism for all payloads and operably coupleable to all vehicles further reduces ground station 300 complexity. For example, traditional systems can have various different couplings, which increases complexity in needing to determine and keep track of which vehicle can couple to which payload. In such embodiments, ground station 300 can keep track of the relative locations of the payloads throughout the various landing receptacles 302, and the coupling mechanism tracking is solved.

Fill subsystem 304 comprises a plurality of pumps, valves, and fluid connectors to fill sprayer payload reservoirs. In an embodiment, fill subsystem 304 is operably coupled to material tanks 306. Fill subsystem 304 is configured to automatically fill, without human intervention, the payloads of ground station 300. In an embodiment, fill subsystem 304 can schedule the various fills according to flight plans for the UAVs interfacing with ground station 300.

For example, each treatment can have a specified flow density in a volume of chemical per area of land. This flow density can depend on the type of chemical and the type of application: point or wide-swath. Embodiments can thus translate a particular proposed treatment raster (PTR) into volumes and weights of specific chemicals. For example, a proposed treatment raster can be derived using agricultural raster data cubes as described in related application "AUTOMATED OPTIMIZATION AGRICULTURAL TREATMENTS BASED ON RASTER IMAGE DATA SYSTEM," incorporated by reference above.

The information about volumes and weights of specific chemicals can be used in the mission planning process to optimize mission plans, as will be described. For example, in order to increase the geographic coverage range of the system, the mission planning code might plan a mission that calls for only a partially filled chemical tank. The lighter weight will allow the drone to fly to a more distant location than if the tank were fully filled. While the drone is in flight, the sprayer payload can use flowmeters and/or tank level sensors to keep track of the remaining amount of chemical.

In embodiments, fill subsystem 304 is further configured to automatically fill, in an ad-hoc manner without human intervention, a payload from a recently-arrived UAV.

Material tanks 306 comprise a plurality of tanks for holding sprayer payload chemicals. In an embodiment, each material tank 306 corresponds to a single sprayer payload. In another embodiment, certain chemicals can be premixed in tanks 306 or in intermediate tanks for particular sprayer payloads, such as high frequency use chemicals.

Battery subsystem 308 comprises a charging device and instructions that, when implemented by a processor operably coupled to memory to recharge the various payload batteries and UAV batteries interfacing with ground station 300. In embodiments, battery subsystem 308 can be operably coupled to fill subsystem 304 to provide charging or recharging to batteries operable coupled to chemical payloads.

Security subsystem 310 comprises safety mechanisms preventing unauthorized access to and/or removal of payloads and/or tanks from ground station 300. Accordingly, security subsystem 310 can be integrated with landing receptacles 302 or components of landing receptacles 302. For example, to prevent unauthorized retrieval, a payload can be configured latch onto the landing receptacle until a vehicle authentication process is complete.

Security subsystem 310 can implement an authentication process for a wired or wireless communication scheme. For example, the payload mating process using a wireless communication network can be implemented as follows: A sprayer vehicle approaching landing receptacle 302 establishes a connection to a wireless network of ground station 300. The vehicle lands on the desired sprayer payload, which is locked to a specific pad or receptacle. The individual payload, or central computer system, verifies the vehicle using an identifier code unique to each vehicle. If the vehicle identifier matches the expected code, the payload is unlocked from its receptacle. The vehicle then departs receptacle 302 with the sprayer payload to carry out its mission.

In an embodiment, security subsystem 310 can implement multi-factor non-mechanical authentication of a payload. In a first authentication step, an optical sensor such as camera or infrared (IR) sensor can detect a particular payload. For example, a camera mounted on a vehicle can view a particular payload. In a second authentication step, identifier code handshaking as described above can be conducted between the vehicle and the optically-detected payload. In further embodiments, other non-mechanical authentication steps can be added. By not requiring mechanical mating, the complexity of the system is reduced and speed of attachment and detachment is increased because the vehicle and payload do not need to be physically matched to be paired.

In another embodiment, a multi-factor optical confirmation can be conducted to ensure that the correct vehicle is mated with the correct chemical payload. In an embodiment, a camera in the vehicle can recognize and identify a feature or printed identification number unique to a chemical payload. A camera on the payload or landing receptacle can recognize and identify a feature or printed identification number unique to a vehicle. Both the vehicle and payload or landing receptacle then communicate through a wireless or wired communication network to security subsystem 310. If the vehicle identifier identified by the payload, and the payload identifier identified by the vehicle match the configuration prescribed in the mission by, for example control subsystem 312, then the visual handshake is successful, and the payload is released from the landing receptacle.

In embodiments, vehicle cameras serve multiple purposes. For example, the camera or cameras on the vehicle used for plant imaging can also be used to perform the aforementioned payload verification imaging upon landing. The camera on the payload or landing receptacle, in addition to verifying the vehicle identifier, can be used to detect the vehicle on its descent, calculate its position and orientation relative to the payload or landing receptacle, and send the calculated relative position and orientation to the vehicle as real-time feedback to increase landing accuracy.

In an embodiment, security subsystem 310 can further implement tamper prevention of the UAVs or material tanks. For example, UAVs and/or material tanks 306 or individual payload reservoirs can comprise vibration sensors to detect tampering. In another embodiment, panels to access the internal plumbing can be positioned in locked portions of the ground station with similar seal-break or vibration sensors. In another embodiment, video, audio, and other security sensors can be configured to monitor the ground station and surrounding area and may be connected with a remote security monitoring system that monitors and/or logs activity in the vicinity of the ground station.

In another embodiment, in order to prevent an unauthorized drone from taking chemicals at ground station 300, security subsystem 310 can coordinate with landing receptacles 302 as described above to indicate which landing pad areas are available, and which chemicals are at which locations. Further, security subsystem 310 can further comprise a mechanical device that restricts landing until handshaking is completed, or restrains an unauthorized UAV if handshaking fails. In another embodiment, security subsystem 310 actuates a cover over ground station 300 to protect ground station 300 from weather and unauthorized drones.

Control subsystem 312 comprises instructions that, when implemented by a processor operably coupled to memory, cause the processor to coordinate takeoff and landing of UAVs at landing receptacles 302, coordinate payload fills or refills from fill subsystem 304 and material tanks 306, coordinate batter recharge and control with battery subsystem 308, and security of ground station 300 and its UAVs with security subsystem 310. In embodiments, control system 312 can further prepare mission plans for the various UAVs.

Control subsystem 312 can receive inputs from each of the subsystems of ground station 300 to coordinate vehicle flight, landing, and general refilling while docked with ground station 300. For example, when a vehicle is approaching ground station 300 for landing, control subsystem 312 can receive information from landing receptacles 302 to indicate which landing pads are clear. Control subsystem 312 can receive information from fill subsystem 304 to indicate that no fill is in progress for the desired payload (or any fill restrictions from a particular landing receptacle) relative to a landing pad. Control subsystem 312 can receive information from battery subsystem 308 that payloads X, Y, and Z are charged, but payloads A, B, and C are in the process of charging (so that the vehicle is directed to a receptacle with a charged payload). Control subsystem 312 can receive information from security subsystem 310 to indicate that the vehicle is authenticated to land. Moreover, control system 312 can receive information from the vehicle or sensors on the vehicle to coordinate landing and takeoff. In an embodiment, as mentioned above, multispectral camera sensors can image an approaching payload to ensure that the vehicle lands on the correct landing pad and relative position for the payload.

In embodiments, control subsystem 312 can further prepare and execute mission plans for the various UAVs. In one embodiment, control subsystem 312 presents a user interface for manual selection of the mission plan. For example, a user can identify agriculture imagery (including, for example, potential treatment areas) and point and click to select various chemicals and chemical applications). In another embodiment, control subsystem 312 automatically detects potential treatment areas based on regions of interest detected in the imaging data and automatically selects the various chemicals and chemical applications. In embodiments, control subsystem 312 can schedule multiple flights and coordinate multiple UAVs.

Figure 4:
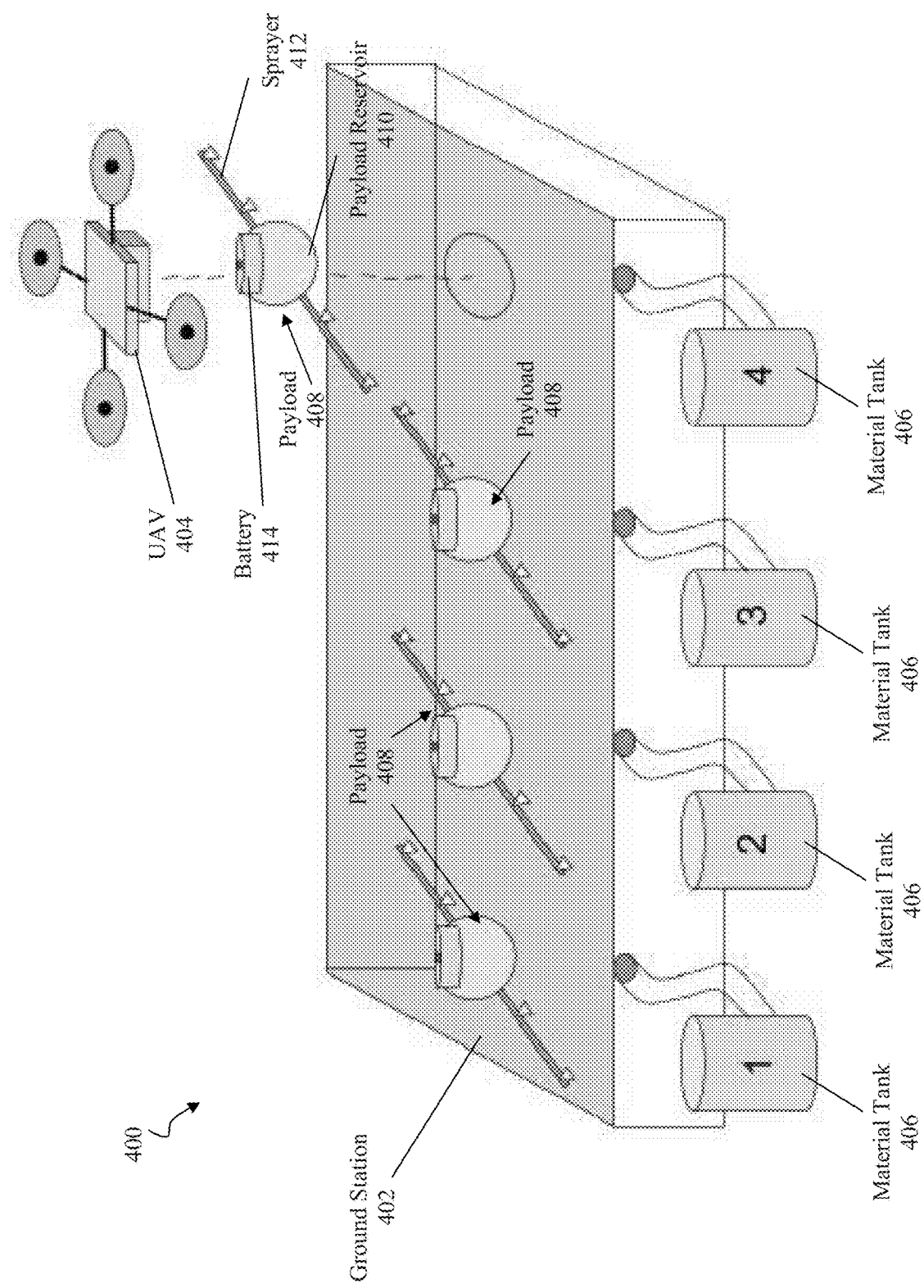
FIG. 4 is a perspective view illustration of a ground station for a system for automated aerial application of agricultural treatments, according to an embodiment.

Referring to FIG. 4, a perspective view illustration of a system 400 for automated aerial application of agricultural treatments is depicted, according to an embodiment. In an embodiment, system 400 generally comprises a ground station 402 and at least one UAV 404.

Ground station 402 is substantially similar to ground stations 102 and 300 described application of agricultural treatments. In an embodiment, ground station 402 comprises a plurality of material tanks 406 for filling a plurality of modular payloads 408. For example, each payload 408 can comprise a payload reservoir 410, a sprayer 412 operably coupled to payload reservoir 410 and a battery 414 for powering sprayer 412 (and optionally, powering UAV 404). Each material tank 406 can be coordinated to fill a particular payload reservoir 410.

In embodiments, ground station 402 can be mobile or fixed to a particular location. For example, ground station 402 can be positioned on a truck trailer for mobile docking. A mobile trailer allows for the same drones and material tanks to be used at multiple agricultural areas. In another embodiment, ground station 402 can be fixed proximate an agricultural area, such as a golf course equipment storage area for treatment of that particular golf course.

System 400 further comprises at least one UAV 404. In embodiments, each UAV 404 is configured to couple to or detach from one or more payloads 408 at ground station 402.

Figure 5:
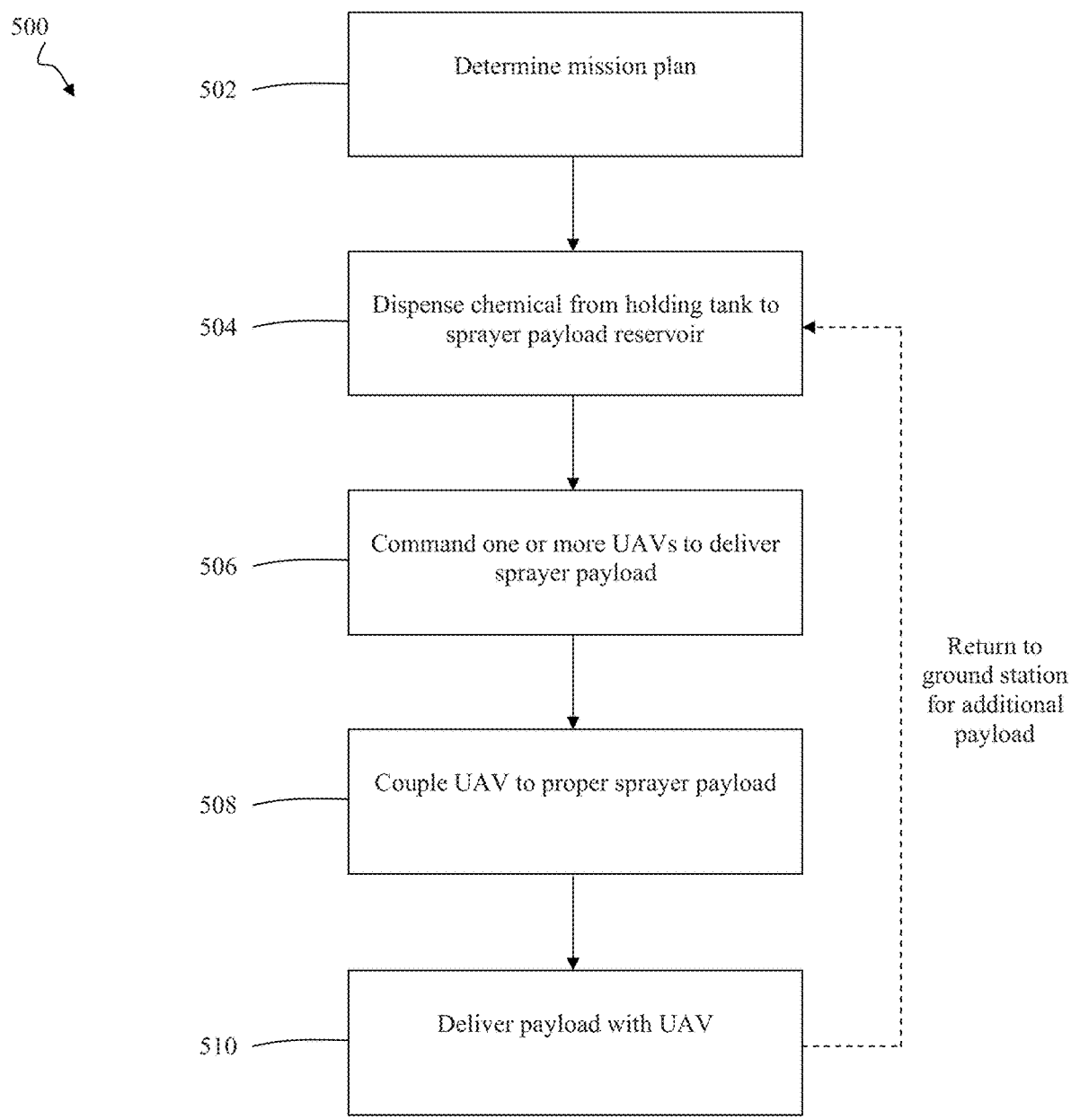
FIG. 5 is a flowchart of a method for automated aerial application of agricultural treatments, according to an embodiment.

Referring also to FIG. 5, a flowchart of a method 500 for automated aerial application of agricultural treatments is depicted, according to an embodiment.

At 502, a mission plan is determined. Guidance, navigation, and control methods are prepared for one or more UAVs. In an embodiment, inputs generated for location and type and quantity of chemical are input into control subsystem 312. For example, a chemical application map, or proposed treatment raster (PTR), can be input from aerial sensor data. With access to this PTR, a mission plan can be devised with one or more flights to execute this chemical application with UAVs. In an embodiment, trajectory tracking control further enables the chemical application with UAVs.

In general, a mission plan is derived by identifying locations and dividing up missions for different chemicals (e.g. a "pesticide mission" or a "fertilizer mission"). Optimal paths for each UAV and optimal quantities of liquid are determined for each UAV (for example, range increases as liquid decreases).

Figure 6:
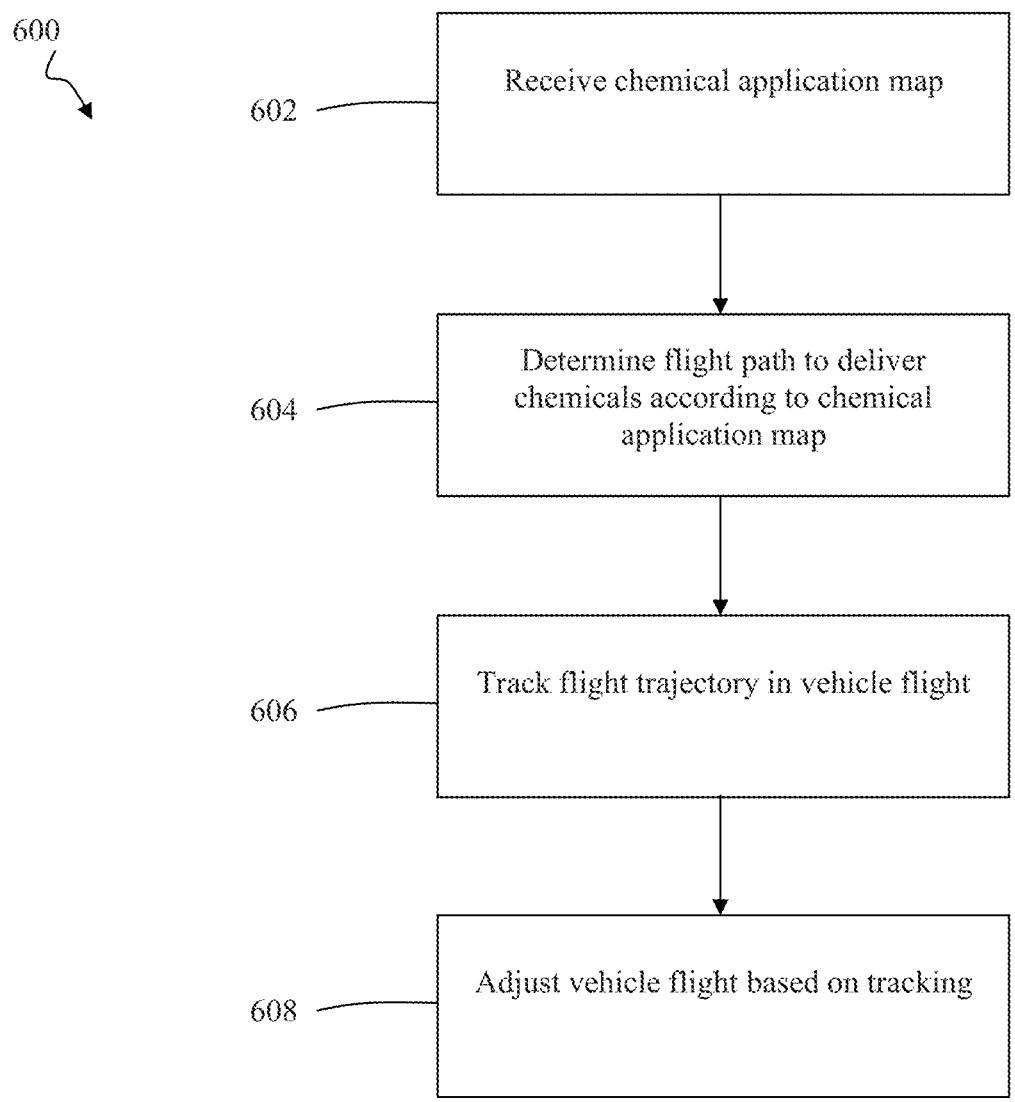
FIG. 6 is a flowchart of a method for flight planning for automated aerial application of agricultural treatments, according to an embodiment.

More particularly, referring to FIG. 6, a flowchart of a method 600 for flight planning for automated aerial application of agricultural treatments is depicted, according to an embodiment.

At 602, a chemical application map is received, such as a proposed treatment raster. In an embodiment, control subsystem 312 can receive the chemical application map or chemical prescription.

In another embodiment, data inputs are a list of geographical locations with prescribed chemical treatments. Rather than a PTR, chemical prescriptions can be derived directly from user input. For example, a human user or a computer algorithm can determine that a single weed exists at a certain coordinate and should be treated with a precisely applied dose of herbicide. Or, an entire area could be designated for blanket spraying with liquid fertilizer.

At 604, a flight path to follow for routing to a relevant area as well as a path to follow during spraying is determined for at least one UAV for chemical delivery of the chemicals according to the chemical application map. In an embodiment, given a PTR, a vehicle flight path is determined that will deliver the correct amount of chemicals to each pixel on the map. Using techniques in optimal control, a path planning algorithm can search for the flight path that covers the regions needing a certain chemical in the minimum distance. Depending on the flight altitude constraint, wind conditions, sprayer nozzles, chemical type, etc. the optimal flight plan may be different. For example, consider two greens on a golf course which need a distribution of fertilizer according to the PTR. The optimal flight path may be to "scan" across the first green in a grid-like path while spraying chemicals, then stop spraying and fly straight to the second green, then continue spraying in a grid-like fashion similar to the first green. In this path planning process, properties such as flight time, total chemical usage, and total battery energy usage can be calculated. This information can be of value to determine if a single vehicle is sufficient for an entire mission or if several vehicles would be required. A smart battery management system can make use of the total estimated energy usage to determine if a full or partial battery charge is necessary, potentially saving time between missions.

At 606, after the flight path (trajectory) is determined, trajectory of one or more vehicles is tracked. In an embodiment, a trajectory tracking algorithm executing on the vehicle's flight computer determines the motor commands necessary to achieve close tracking of the desired path. In an embodiment, a feedback control system can be utilized. For example, in order to have a functional feedback control system, good estimation of the vehicle's position and orientation are critical. To achieve good estimation, a Real Time Kinematic (RTK) global positioning system (GPS) can be used. RTK GPS is a high precision Global Positioning System which uses phase corrections of the L1 GPS signal to achieve an accuracy of approximately 1 CM.

At 608, adjustment of the flight path can be made based on the trajectory tracking at 606, in an embodiment.

Returning again to FIG. 5, method 500 further comprises dispensing a chemical from one of the multiple ground-based holding tanks to one of the sprayer payload reservoirs at 504. Embodiments calculate the necessary amount of the desired liquid for the task, based on the type of spray and the area to be covered. Filling the tank with only the required amount of liquid reduces the energy consumed by the flight vehicle.

In an embodiment, each holding tank can be plumbed directly to a single corresponding payload reservoir. Alternatively, the holding tanks can be plumbed into an intermediate mixing manifold, where the chemicals can be blended with each other or diluted with externally-supplied water before being pumped into the sprayer payload reservoir. In another embodiment, a dry chemical hopper can store chemicals and be configured for mixing and dissolving of chemicals before filling a sprayer payload reservoir. At 504, the payload battery can be checked for proper charging.

One skilled in the art will appreciate that 502 and 504 can be conducted out of order, such that chemicals are prefilled in certain payloads on the ground station and the mission plan simply indicates which payload a UAV should take.

At 506, one or more UAVs are commanded to dispense one of the filled reservoirs. In an embodiment, the mission plan can be uploaded to a UAV, or controlled in real-time from a ground station.

At 508, the commanded UAV positions itself over the sprayer payload that is going to be used, descends over it, and actuates the attachment interface to operably couple to the payload. In embodiments, the UAV is engaged with the ground station.

At 510, the UAV disengages from the ground station and takes off with the sprayer payload. The UAV can then fly to the location where the spray treatment is to be applied. After spraying, the UAV can proceed to a different area, or return to the ground station to pick up a new sprayer payload, as depicted in the option recursion in FIG. 5.

In an embodiment, during flight, the chemical levels for a particular payload can be monitored. Similarly, the battery levels for the UAV and payload sprayer can be monitored. The ground station can recall the UAV early if either the payload levels or battery are unexpectedly low.

In an embodiment, after returning to the landing pad, a UAV can pick up another payload, detach the payload, recharge, or take off for an imaging mission. Unlike existing sprayer drones that must always carry their heavy sprayer components, the modular nature of the sprayer, payload, battery, etc. allows the flight vehicle to carry out much longer-range missions by flying without unnecessary heavy components. This adds the capability of flying imaging missions with small multispectral cameras. Thus, the system is a complete hardware solution for autonomous precision agriculture, providing both imagery and chemical application.

Figure 7A:
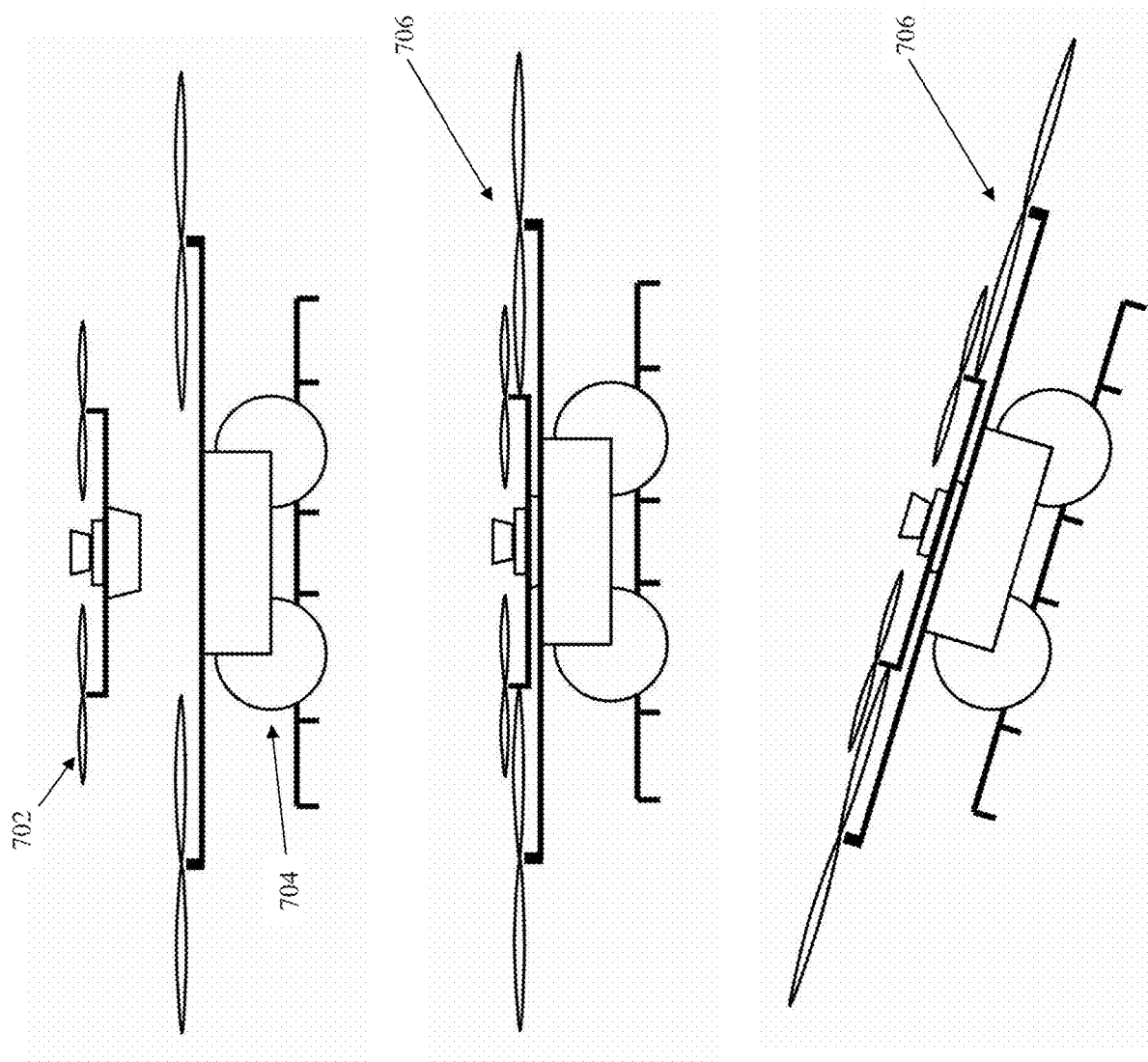
FIG. 7A is a side view illustration of a thrust-assisting payload on an unmanned aerial vehicle, according to an embodiment.

Referring to FIG. 7A, a side view illustration of a thrust-assisting payload on an unmanned aerial vehicle is depicted, according to an embodiment. In general, interchangeable payloads are further enhanced by incorporating thrust capabilities into the payloads themselves.

For example, a smaller imaging drone can carry a large chemical application payload because the payload provides a portion of the vehicle's total thrust. Similar to the embodiment described herein with a sprayer payload having the capability to extend flight time of the vehicle through integrated onboard batteries, embodiments can further include payloads with electric motors, motor speed controllers, and propellers. While these components nearly create an entire UAV on their own, the key differentiator is that the payloads will not have their own flight control computer. In certain embodiments, with regard to flight planning and communication, such solutions further simplify the problem of needing different dedicated vehicles for imaging or chemical application.

Figure 7B:
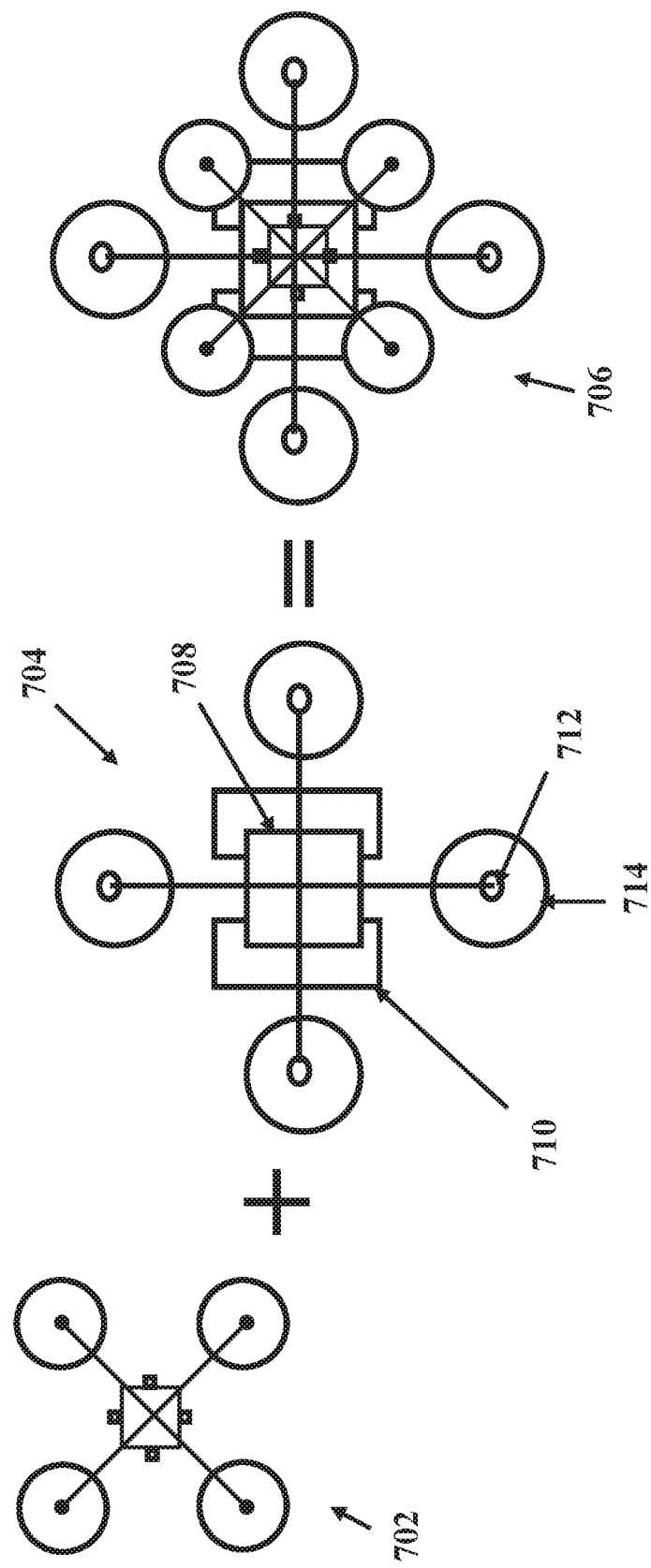
FIG. 7B is a top view illustration of the thrust-assisting payload on an unmanned aerial vehicle of FIG. 7A, according to an embodiment.

In FIG. 7A, a small imaging drone 702 is depicted as attaching to a thrust-assisting payload 704, resulting in combined vehicle 706. Referring to FIG. 7B, a top view illustration of thrust-assisting payload 7040 on the unmanned aerial vehicle of FIG. 7A is depicted, according to an embodiment.

As illustrated, thrust-assisting payload 704 generally comprises a mating body 708, one or more sprayer tanks 710, and a plurality of thrust units each having a motor 712 and a propeller 714. Small imaging drone 702 is configured to operably couple with mating body 708. Notably, the motors 712 and propellers 714 of thrust-assisting payload 704 are positioned in relative voids of the engines and propellers of small imaging drone 702.

For the embodiments described herein, various centration devices can be utilized. For example, even with precision guidance and control, UAVs can also use a mechanical means for ensuring that the UAV ends up in exactly the correct location on top of the desired sprayer payload package.

Figure 8:
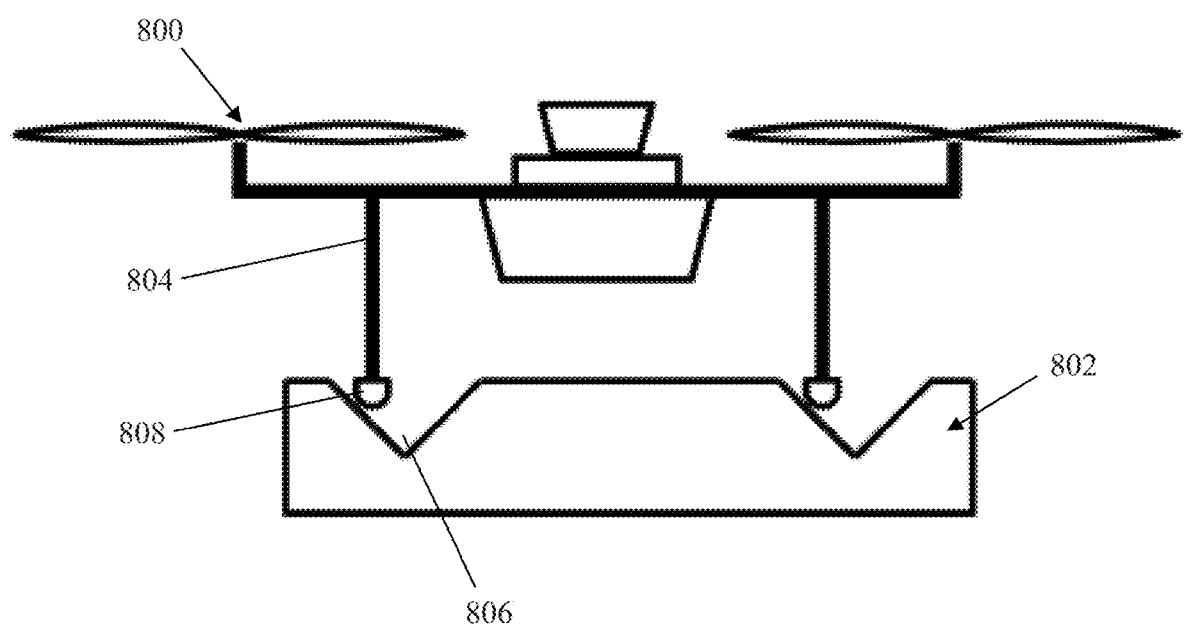
FIG. 8 is a side view of an unmanned aerial vehicle and a landing pad using a cone and drogue centration system, according to an embodiment.

Referring to FIG. 8, a side view of an unmanned aerial vehicle 800 and a landing pad 802 using a cone and drogue centration system is depicted, according to an embodiment. The depicted cone and drogue system of centration guides UAV mating.

In an embodiment, vehicle 800 having legs 804 of a given length descends onto a landing pad 802 having upward facing cones 806. Landing pad 802 comprises one cone 806 per vehicle leg 804. As long as vehicle legs 804 are within the radius of their respective cone 806 upon descent, leg feet 808 will slide down the inner surface of cones 806 and be gravitationally fed inward toward the bottom of cone 806. Once all of the vehicle leg feet 808 are at the bottom of their respective cone 806, vehicle 800 is centered on landing pad 802.

Figure 9:
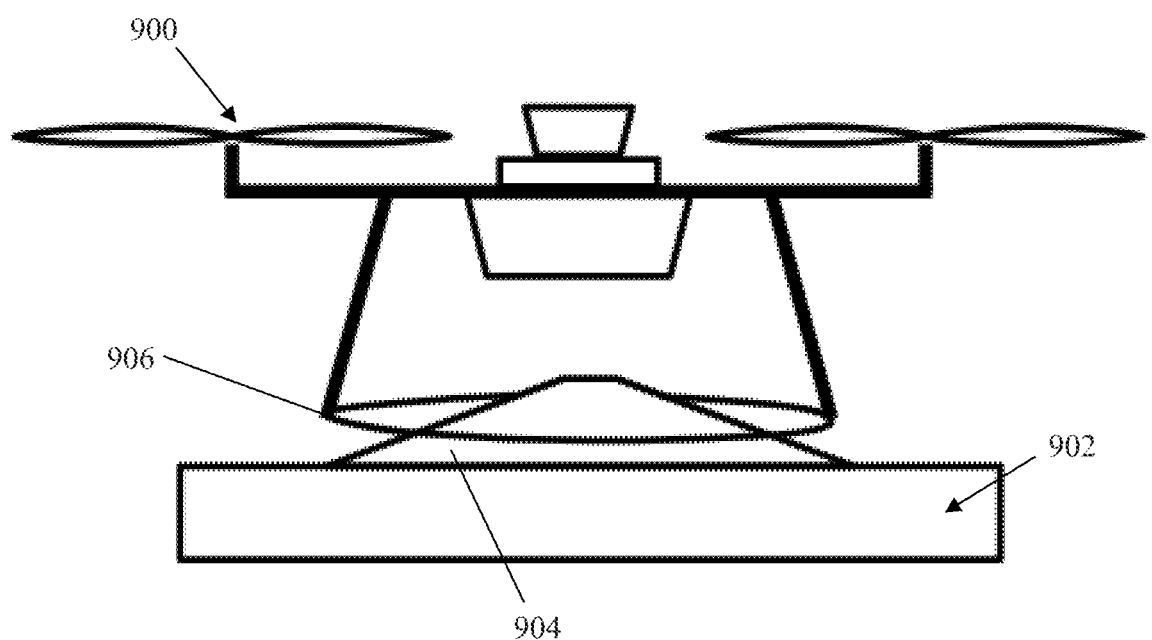
FIG. 9 is a perspective view of an unmanned aerial vehicle and a landing pad using an inverted cone centration system, according to an embodiment.

In another embodiment, an "inverted code" system of centration guides UAV mating. Referring to FIG. 9, a perspective view of an unmanned aerial vehicle 900 and a landing pad 902 using an inverted cone centration system is depicted, according to an embodiment.

Similar to the cone style centration system of FIG. 8, an inverted cone 904 on landing pad 902 uses a gravitationally centering approach. For example, as depicted, landing pad 902 having an upward protruding cone 904 for vehicle 900 to land on is utilized. For vehicle 900 to be centered by cone 904, vehicle 900 includes a ring 906 the same diameter as the base of cone 904 to be affixed to the bottom of the airframe. Upon descent, vehicle 900 positions ring 906 over the tip of cone 904. As vehicle 900 continues to descend, ring 906 slides along cone 904 until it reaches the flat base of landing pad 902.

Figure 10:
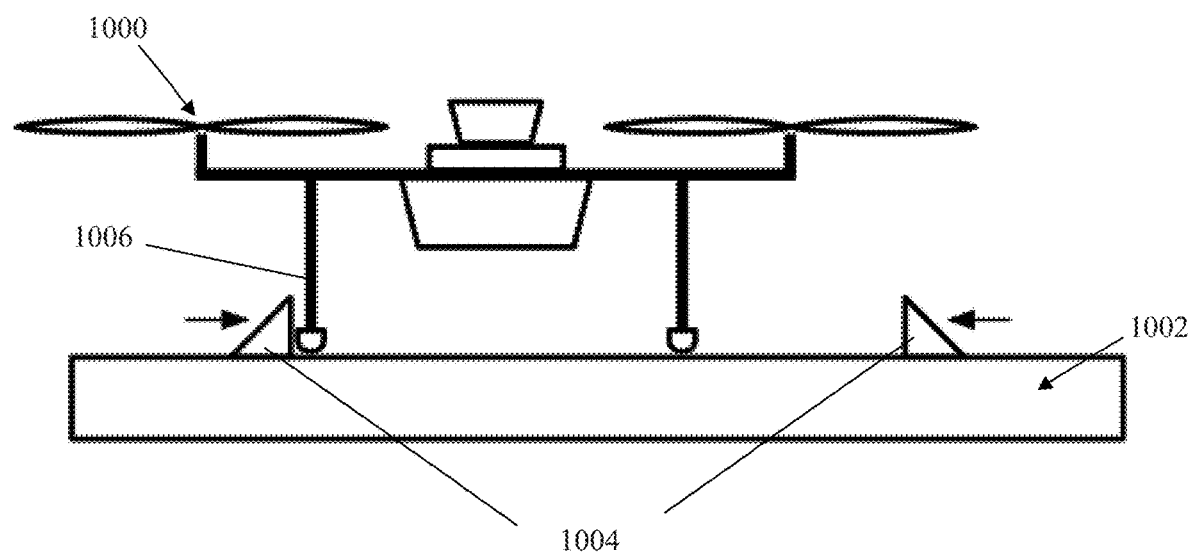
FIG. 10 is a side view of an unmanned aerial vehicle and a landing pad using a linear push bar centration system, according to an embodiment.

In another embodiment, a "linear pusher bar active" system of centration guides UAV mating. Referring to FIG. 10, a side view of an unmanned aerial vehicle 1000 and a landing pad 1002 using a linear push bar centration system is depicted, according to an embodiment.

In contrast to the other centration systems described above, a linear pusher bar system does not rely on gravity to center vehicle 1000. Instead, vehicle 1000 lands on a flat landing pad 1002 large enough to accommodate any positioning errors during the descent phase. Once vehicle 1000 has landed on landing pad 1002, a set of rails 1004 are actuated inward to push vehicle by its legs 1006 toward the center of landing pad 1002. Once vehicle 1000 is centered in the left/right direction, for example, another set of bars can center vehicle 1000 in the forward/backward direction.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for automated aerial application of agricultural treatments to an agricultural area, the system comprising:
    a plurality of unmanned aerial vehicles (UAVs), each UAV configured to operably couple to one of a plurality of modular sprayer payloads and aerially distribute sprayer payload chemical materials over at least one programmed targeted smaller area within the agricultural area, wherein each modular sprayer payload includes
        a payload reservoir configured to hold a specific payload chemical material, a spray nozzle configured to selectively apply the specific payload chemical material to the at least one targeted smaller area of the agricultural area, a pump configured to pump the specific payload chemical material from the modular payload reservoir to the spray nozzle, and a battery configured to power the pump; and a ground station including:

a plurality of landing pads, each landing pad configured to receive a UAV and operably couple at least one of the modular sprayer payloads that is configured to be supported by that landing pad to the UAV, a plurality of material tanks, each material tank configured to hold a single sprayer payload chemical material, a fill subsystem operably coupled to the plurality of material tanks and the plurality of landing pads and configured to selectively automatically fill at least one modular payload reservoir positioned at one or more of the plurality of landing pads, and a control subsystem comprising instructions that, when implemented by a processor operably coupled to memory, cause the processor to:

receive a chemical application map associated with the agricultural area that includes a multitude of targeted smaller areas within the agricultural area, each targeted smaller area having an application plan for application of payload chemical materials to that targeted smaller area, determine a mission plan for the plurality of UAVs based on the chemical application map to deliver payload chemical materials to the multitude of targeted smaller areas consistent with the application plan for each targeted smaller area, command one or more of the plurality of UAVs to selectively fly to each of the multitude of smaller targeted areas according to the mission plan and deliver sprayer payload chemicals materials to the multitude of targeted areas of the agricultural area according to the mission plan, and command the fill subsystem to automatically fill the at least one payload reservoir of a given modular sprayer payload from a selective one of the plurality of material tanks based on the chemical application map prior to commanding the landing pad to couple the given modular sprayer payload to the one of the plurality of UAVs to deliver the specific payload chemical materials to the multitude of targeted smaller areas consistent with the application plan for each targeted smaller area.

2. The system of claim 1, wherein the battery in the modular sprayer payload is further configured to power the UAV coupled to the modular sprayer payload.

3. The system of claim 1, wherein the modular sprayer payload further comprises a payload attachment interface configured to mechanically and electrically couple to a corresponding UAV attachment interface.

4. The system of claim 1, wherein the ground station further includes a recharging subsystem configured to recharge the batteries in the modular sprayer payloads when the modular sprayer payloads are at the ground station.

5. The system of claim 1, wherein the ground station further includes a security subsystem configured to prevent unauthorized access to the ground station.

6. The system of claim 5, wherein the security subsystem is configured to authenticate UAVs for the given modular sprayer payload by:

receiving a vehicle identifier code from the one of the plurality of UAVs;

comparing the vehicle identifier code to an expected code; and releasing the given modular sprayer payload if the vehicle identifier code matches the expected code upon command by the control subsystem to couple the given modular sprayer payload to the one of the plurality of UAVs.

7. The system of claim 5, wherein the security subsystem is configured to communicate to a landing UAV which of the plurality of landing pads are available for landing and which of the specific payload chemical materials available at each of the plurality of landing pads.

8. The system of claim 1, wherein the control subsystem is configured to receive a proposed treatment raster (PTR) as the chemical application map, and determining a mission plan for the plurality of UAVs includes:

determining a flight path for routing at least one of the UAVs to the agricultural area;

determining a delivery path to follow during delivery of the specific payload chemical materials to the multitude of targeted smaller areas consistent with the application plan for each targeted smaller area;

tracking flight trajectory using a feedback control system with an estimation of the UAV position based on global positioning system (GPS) data; and adjusting one or more of the flight path and the delivery path based on the tracking.

9. The system of claim 1, wherein each landing pad is configured to receive a UAV by centering the UAV with at least one of a tube-spar system, a cone and drogue system, an inverted cone system, or a linear push bar system.

10. The system of claim 1, wherein each modular sprayer payload comprises a single payload reservoir.

11. A method of automated aerial application of agricultural treatments, the method comprising:

providing a plurality of unmanned aerial vehicles (UAVs), each UAV configured to operably couple to one of a plurality of modular sprayer payloads and aerially distribute sprayer payload chemical materials over at least one programmed targeted smaller area of the agricultural area, wherein each modular sprayer payload includes a payload reservoir configured to hold a specific payload chemical material, a spray nozzle configured to selectively apply the payload chemical material to the at least one targeted smaller area of the agricultural area, a pump configured to pump the specific payload chemical from the payload reservoir to the spray nozzle, and a battery configured to power the pump;

providing a ground station including a plurality of landing pads, each landing pad configured to receive a UAV and operably couple at least one modular sprayer payload to the UAV at the landing pad, a plurality of material tanks, each material tank configured to hold a single sprayer payload chemical material, and a fill subsystem operably coupled to the plurality of material tanks and the plurality of landing pads and configured to selectively automatically fill at least one modular payload reservoir positioned at one or more of the plurality of landing pads, and a control subsystem comprising instructions that, when implemented by a processor operably coupled to memory, cause the processor to:

receive a chemical application map associated with the agricultural area that includes a multitude of targeted smaller areas of the agricultural area, each targeted smaller area having an application plan for application of payload chemical materials to that targeted smaller area;

determine a mission plan for the plurality of UAVs based on the chemical application map to deliver payload chemical materials to the multitude of targeted smaller areas consistent with the application plan for each targeted smaller area;

automatically fill at least one modular payload reservoir based on the chemical application map; and command one or more of the plurality of UAVs to selectively fly to each of the multitude of smaller targeted areas according to the mission plan and deliver sprayer payload chemical materials to the multitude of targeted areas of the agricultural area according to the mission plan.

12. The method of claim 11, further comprising authenticating one of the plurality of UAVs to a modular sprayer payload by receiving a vehicle identifier code from the one of the plurality of UAVs;

comparing the vehicle identifier code to an expected code; and releasing the modular sprayer payload to be coupled to the one of the plurality of UAVs if the vehicle identifier code matches the expected code.

13. The method of claim 11, further comprising:

communicating to a landing UAV which of the plurality of landing pads are available for landing and which of the payload chemicals is available at each of the plurality of landing pads.

14. The method of claim 11, wherein a proposed treatment raster (PTR) is the chemical application map, and determining a mission plan for the plurality of UAVs further comprises:

determining a flight path for routing at least one of the plurality of UAVs to the agricultural area;

determining a delivery path to follow during delivery of the sprayer payload chemicals to the multitude of targeted smaller areas consistent with the application plan for each targeted smaller area;

tracking flight trajectory using a feedback control system with an estimation of the UAV position of the at least one of the plurality of UAVs based on global positioning system (GPS) data; and adjusting at least one of the flight path and the delivery path based on the tracking.

15. The system of claim 1, wherein the specific payload chemical material is a liquid and the modular sprayer payload for the liquid further comprises at least one of a set of internal tank baffles and an open-cell foam within the payload reservoir configured to reduce sudden shifts in the liquid.

16. The system of claim 1, wherein the modular sprayer payload comprises a plurality of payload reservoirs each configured with electronically controlled valves that allow coordinated discharge from each of the plurality of payload reservoirs simultaneously.

17. The system of claim 1, wherein the control subsystem is provided with information about volumes and weights of the specific chemical payload materials that are used in the mission planning process to optimize mission plans.

18. The system of claim 17, wherein the mission planning process produces a mission plan that calls for only a partially filled payload reservoir that enables the UAV to fly to a targeted smaller area that is more distant location from the base station than if the payload reservoir were fully filled.

* * * * *